(12) United States Patent
Okuda et al.

(10) Patent No.: US 7,714,482 B2
(45) Date of Patent: May 11, 2010

(54) ULTRASONIC SENSOR

(75) Inventors: Yasuyuki Okuda, Aichi-gun (JP); Makiko Sugiura, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/230,955

(22) Filed: Sep. 9, 2008

(65) Prior Publication Data

US 2009/0085439 A1   Apr. 2, 2009

(30) Foreign Application Priority Data

Sep. 28, 2007   (JP) .............................. 2007-254666

(51) Int. Cl.
*H01L 41/08* (2006.01)
(52) U.S. Cl. ..................................... 310/334
(58) Field of Classification Search ................. 310/322, 310/334
See application file for complete search history.

(56) References Cited

U.S. PATENT DOCUMENTS

| | | | |
|---|---|---|---|
| 5,142,187 A * | 8/1992 | Saito et al. ................... 310/358 |
| 5,191,796 A | 3/1993 | Kishi et al. |
| 6,441,538 B1 * | 8/2002 | Spigelmyer .................. 310/334 |
| 7,053,531 B2 * | 5/2006 | Chisaka et al. .............. 310/334 |
| 7,109,642 B2 * | 9/2006 | Scott ........................... 310/334 |
| 7,132,780 B2 * | 11/2006 | Scott ...................... 310/316.01 |
| 7,309,948 B2 * | 12/2007 | Kuniyasu et al. ............. 310/334 |
| 7,459,836 B2 * | 12/2008 | Scott ........................... 310/334 |
| 2003/0102777 A1 | 6/2003 | Kuniyasu et al. |
| 2003/0189391 A1 * | 10/2003 | Shimizu ...................... 310/334 |
| 2005/0156492 A1 * | 7/2005 | Utke ............................ 312/236 |
| 2006/0002235 A1 * | 1/2006 | Knowles et al. .............. 367/181 |
| 2006/0043843 A1 | 3/2006 | Sugiura et al. |
| 2006/0181177 A1 * | 8/2006 | Osawa ........................ 310/322 |
| 2007/0040477 A1 | 2/2007 | Sugiura et al. |
| 2008/0072675 A1 * | 3/2008 | Okuda et al. ................... 73/627 |
| 2008/0116765 A1 | 5/2008 | Sugiura et al. |
| 2008/0224567 A1 * | 9/2008 | Sugiura et al. .............. 310/322 |
| 2008/0238259 A1 * | 10/2008 | Osawa ........................ 310/334 |
| 2008/0307888 A1 * | 12/2008 | Yoshioka et al. .............. 73/627 |
| 2009/0015105 A1 * | 1/2009 | Sugiura et al. .............. 310/334 |

FOREIGN PATENT DOCUMENTS

JP   S32-004036   6/1957

(Continued)

OTHER PUBLICATIONS

Office Action mailed on Aug. 4, 2009 from the Japan Patent Office for corresponding application No. 2007-254666 (English translation enclosed).

(Continued)

*Primary Examiner*—Thomas M Dougherty
(74) *Attorney, Agent, or Firm*—Posz Law Group, PLC

(57) ABSTRACT

An ultrasonic sensor is disclosed. The ultrasonic sensor includes a plurality of sensor elements arranged in an array. Each sensor element includes an ultrasonic sensing element and an acoustic matching member. The ultrasonic sensor further includes a bonding member having a thickness approximately equal to a space interval between adjacent ultrasonic sensing elements. The bonding member adhesively fixes the plurality of sensor elements, and includes a portion contacting each ultrasonic sensing element. An elastic modulus of the portion is smaller than that of each ultrasonic sensing element.

10 Claims, 13 Drawing Sheets

FOREIGN PATENT DOCUMENTS

| | | |
|---|---|---|
| JP | A-60-256039 | 12/1985 |
| JP | A-63-151299 | 6/1988 |
| JP | 63-164700 * | 7/1988 |
| JP | A-H04-062468 | 2/1992 |
| JP | A-H11-299779 | 11/1999 |
| JP | A-2002-186617 | 7/2002 |
| JP | A-2004-343304 | 12/2004 |
| JP | A-2004-354170 | 12/2004 |

OTHER PUBLICATIONS

Office Action mailed on Nov. 24, 2009 from the Japan Patent Office for corresponding application No. 2007-254666 (English translation enclosed).

* cited by examiner

ULTRASONIC SENSOR

CROSS REFERENCE TO RELATED APPLICATION

The present application is based on Japanese Patent Application No. 2007-254666 filed on Sep. 28 2007, the disclosure of which is incorporated herein by reference.

BACKGROUND OF THE INVENTION

1. Field of the Invention

The present invention relates to an ultrasonic sensor including multiple sensor elements arranged in an array.

2. Description of Related Art

An ultrasonic sensor that has multiple sensor elements arranged in an array has been known. Such an ultrasonic sensor is used for measuring a location of an obstacle existing forward of the ultrasonic sensor, and used for sensing a shape of the obstacle. Also, an ultrasonic transducer for obtaining an ultrasound image has been known in, for example, a medical field. When this type of an ultrasonic sensor measures a location and a shape of an obstacle, it is typically required to obtain a time interval between transmission and reception of the ultrasonic wave. Further, it is required to obtain a difference in time or phase between the ultrasonic wave received by one sensor element and that received by another sensor element.

In the ultrasonic sensor, the positioning accuracy of the sensor elements influences accuracy for detecting the difference in the time or phase of the ultrasonic wave. It is therefore important to improve the positioning accuracy of the sensor elements. Japanese Patent Application Publication 2003-235098 corresponding to U.S. Pat. No. 7,309,948 discloses an ultrasonic sensor, in which a fixation member made of hard resin plays a role in positioning a transducer.

In the ultrasonic sensor disclosed in Japanese Patent Application Publication 2003-235098, since the fixation member is made of hard material, the fixation member restrains vibrations of the transducer, and as a result, sensitivity for detection of the ultrasonic wave is lowered. Regarding an ultrasonic sensor for monitoring a space around a vehicle, the ultrasonic sensor typically employs an ultrasonic wave with low frequencies. In this case, the ultrasonic wave has a large amplitude, and a hard fixation member causes an ultrasonic wave to be damped remarkably. Further, the hard fixation member can conduct vibrations from one transducer to another transducer, resulting in a worse cross-talk characteristic.

SUMMARY OF THE INVENTION

In view of the above and other difficulties, it is an objective of the present invention to provide an ultrasonic sensor with high positioning accuracy of sensor elements and lower ultrasonic wave attenuation.

According to a first aspect of the present invention, an ultrasonic sensor is provided. The ultrasonic sensor includes multiple sensor elements arranged in an array. Each sensor element has an ultrasonic sensing element for sensing an ultrasonic wave reflected by an object. Each sensor element further has an acoustic matching member having a reception surface for receiving the ultrasonic wave reflected by the object. The reception surface is directed to a space where the object is expected to exist. A surface of the acoustic matching member opposed to the reception surface is connected with the ultrasonic sensing element. The acoustic matching member conducts the ultrasonic wave received by the reception surface to the ultrasonic sensing element. The ultrasonic sensor further includes a bonding member having a thickness approximately equal to a space interval between adjacent ultrasonic sensing elements. The bonding member adhesively fixes the multiple sensor elements. The bonding member includes a portion contacting each ultrasonic sensing element. An elastic modulus of the portion is smaller than that of each ultrasonic sensing element.

According to the above ultrasonic sensor, since the ultrasonic sensor includes the bonding member having the thickness approximately equal to the space interval between the adjacent ultrasonic sensing elements, the space interval between each adjacent ultrasonic sensing elements cam be precisely maintained. Therefore it is possible to accurately position each sensor element at a predetermined position. That is, it is possible to improve positioning accuracy of the multiple sensor elements. Further, since the elastic modulus of the portion of the bonding member contacting each ultrasonic sensing element is smaller than that of each ultrasonic sensing element, the bonding member does not strongly restrain vibrations in the ultrasonic sensing elements. Therefore, in the ultrasonic sensor, detection sensitivity for the ultrasonic wave can be maintained at a favorable condition. Further, since vibration conduction between the ultrasonic sensing elements hardly occurs, the ultrasonic wave is separately and individually conducted in each sensor element. Accordingly, vibration noise and ultrasonic wave attenuation are reduced. Therefore, the ultrasonic sensor has a favorable cross talk characteristic.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

An ultrasonic sensor 10 is described below with reference to FIGS. 1A to 4B in accordance with a first embodiment. In the followings, explanation is given on an ultrasonic sensor used as an obstacle sensor mounted to a vehicle in accordance with one example of use.

Figure 1A:
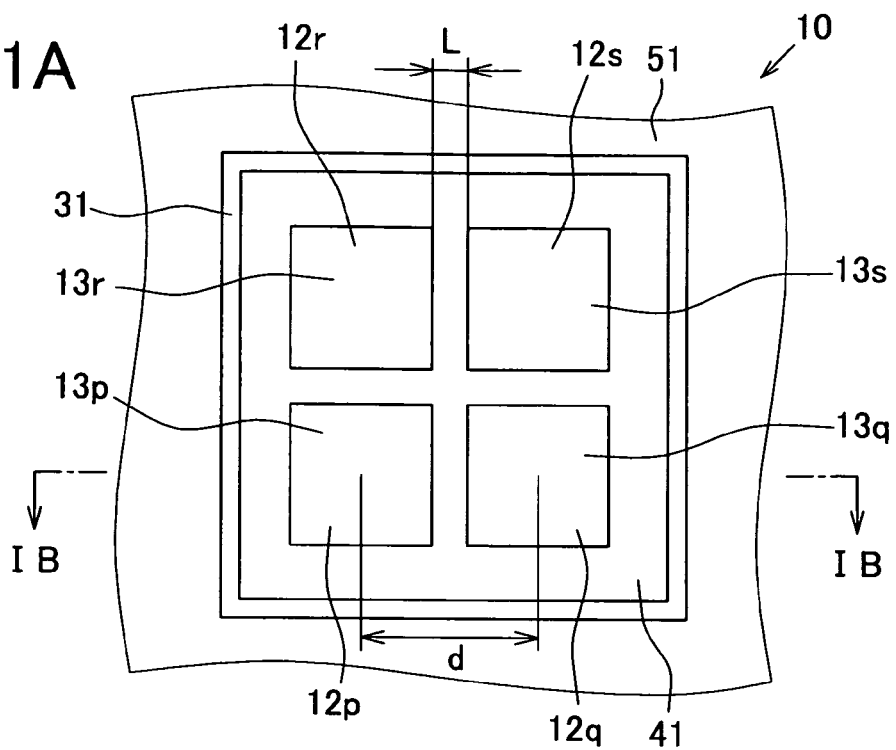
FIG. 1A is a schematic plan view diagram illustrating an ultrasonic sensor in accordance with a first embodiment, the diagram being viewed from an acoustic matching member side.
Figure 1B:
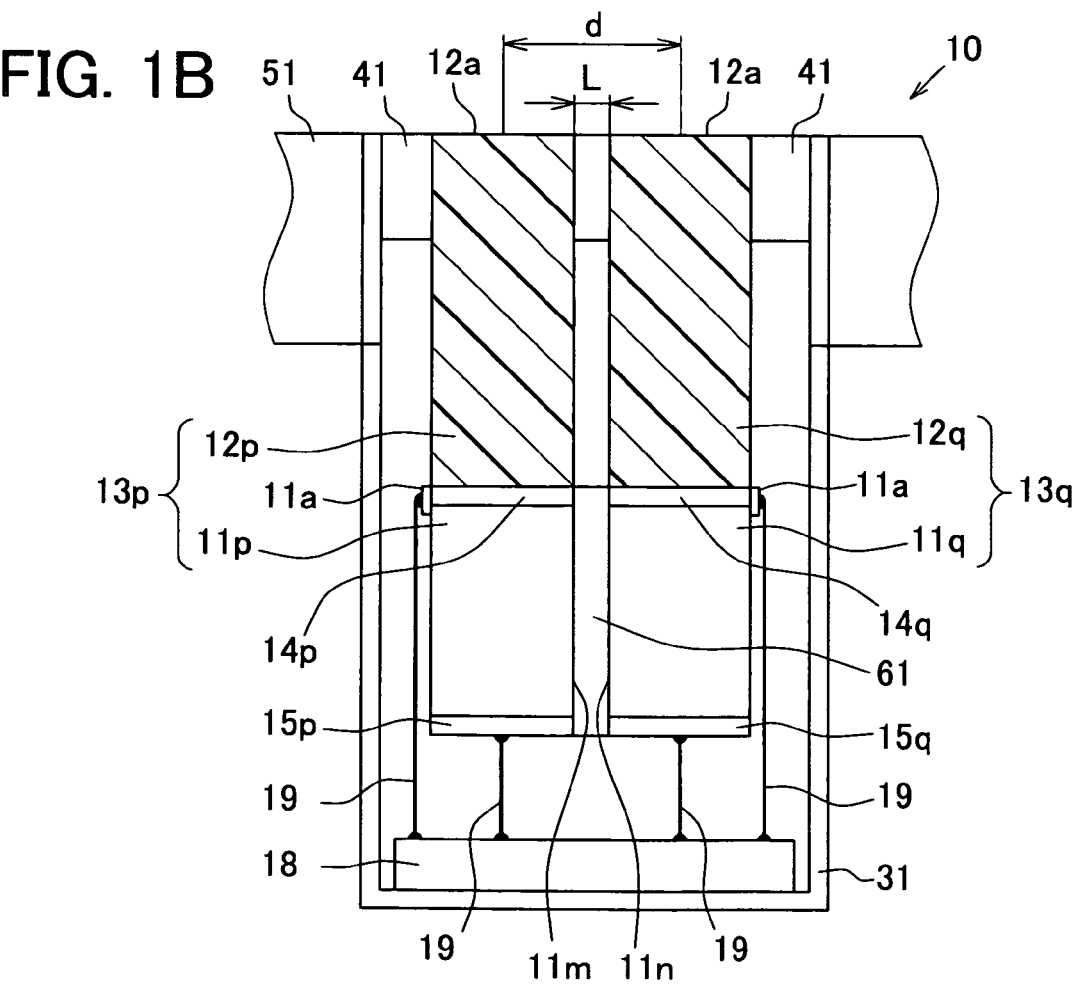
FIG. 1B is a schematic cross sectional view of the ultrasonic sensor taken along line 1B-1B in FIG. 1A.

A configuration of the ultrasonic sensor 10 is described below. As shown in FIGS. 1A and 1B, the ultrasonic sensor 10 includes a body 31, a circuit element 18, and multiple sensor elements 13p, 13q, 13r, 13s. The circuit element 18 and multiple sensor elements 13p, 13q, 13r, 13s are disposed in the body 31. The multiple sensor elements 13p, 13q, 13r, 13s are four elements which are arranged in an array so that each row in a longitudinal direction has two sensor elements, and each row in a lateral direction has two sensor elements. The circuit element 18 is electrically connected with the multiple sensor elements 13p, 13q, 13r, 13s. The circuit element 18 inputs and outputs voltage signals, which are associated with ultrasonic wave transmission and ultrasonic wave reception, respectively.

The ultrasonic sensor 10 is mounted to, for example, a bumper 51 of the vehicle. The ultrasonic sensor 10 is configured to detect a location of an obstacle in a three-dimensional detection manner.

Since the sensor elements 13p, 13q, 13r, 13s have a substantially same configuration, a configuration of one sensor element 13p is explained below. The sensor element 13p includes a piezoelectric element 11p (i.e., an ultrasonic sensing element) for transmitting and receiving the ultrasonic wave. The sensor element 13p further includes an acoustic matching member 12p, which is joined with the piezoelectric element 11p. The acoustic matching member 12p conducts the ultrasonic wave oscillated by the piezoelectric element 11p, and send the ultrasonic wave in a forward direction of the vehicle. The acoustic matching member 12p receives the ultrasonic wave reflected by an obstacle, and conducts vibrations to the piezoelectric element 11p. That is, each sensor element 13p, 13q, 13r, 13s is capable of transmitting and receiving the ultrasonic wave, and functions as a transmission element and a reception element.

The piezoelectric element 11p is made of, for example, lead zirconium titanate (PZT). The piezoelectric element 11p includes a piezoelectric member and a pair of electrodes. The piezoelectric member has a substantially quadratic prism shape whose cross section is substantially similar to that of the acoustic matching member 12p in shape. The pair of electrodes is formed on opposite surfaces of the piezoelectric member by Pt or Cu sputtering, plating, conductive paste printing, or the like. One of the electrodes located on an acoustic matching member 12p side is referred to as a first electrode 14p. The other of the electrodes opposed to the first electrode is referred to as a second electrode 15p.

A line element 11a is located on a side of the piezoelectric element 11p, and is electrically connected with the first electrode 14p. The first electrode 14p of the piezoelectric element 11p is electrically connected with the circuit element 18 through a wire 19, which has electrical connection with the line element 11a. The second electrode 15p of the piezoelectric element 11p is electrically connected with the circuit element 18 through the wire 19.

An acoustic impedance of the acoustic matching member 12p is larger than that of air and smaller than that of the piezoelectric element 11p. The acoustic matching member 12p is made of resin having high durability such as polycarbonate resin. The acoustic matching members 12p to 12s are arranged so that a distance "d" between the centers of the adjacent acoustic matching members is approximately equal to half of the wavelength of the ultrasonic wave. The acoustic matching members 12p to 12s are fixed in an opening of the body 31. A vibration damping member 41 is located between side surfaces of the acoustic matching members 12p to 12s so that the vibration damping member 41 is located close to the transmission reception surfaces 12a of the acoustic matching members 12p to 12s. The vibration damping member 41 is also located between an inner wall of the opening of the body 31 and each acoustic matching member 12p to 12s so that the vibration damping member 41 is located close to the transmission reception surfaces 12a. The vibration damping member 41 effectively prevents ultrasonic wave from conducting therethrough.

The acoustic matching member 12p is formed so that: a width W of the acoustic matching member 12p is less than or equal to half of the wavelength of ultrasonic wave measured in air; a thickness is approximately equal to one-quarter of the wavelength of the ultrasonic wave measured in the acoustic matching member 12p. The thickness with approximately one-quarter of the ultrasonic wave causes generation of a standing wave in the acoustic matching member 12p. Thereby, it is possible to restrict interference and resultant cancellation of the following ultrasonic waves; one is the wave that impinges in the acoustic matching member 12p; and the other is the wave that is reflected at a boundary between the acoustic matching member 12p and the piezoelectric element 11p. Thus, the acoustic matching member 12p can efficiently conduct the ultrasonic wave to the piezoelectric element 11p.

The circuit element 18 is electrically connected with an electronic control unit (ECU; not shown) mounted to a vehicle. The ECU outputs a control signal for controlling a sound pressure and a phase of the ultrasonic wave to be sent out from the ultrasonic sensor 10. Based on the controls signal, the circuit element 18 outputs a voltage signal to the piezoelectric element 11p so that the piezoelectric element 11p oscillates the ultrasonic wave. When the ultrasonic wave is received, the piezoelectric element 11p outputs to the circuit element 18 a voltage signal which depends on a sound pressure and a phase of the received ultrasonic wave. Based on the voltage signal from the piezoelectric element 11p, the circuit element 18 performs an arithmetic processing and outputs a vibration signal to the ECU.

A bonding member 61 is located between each adjacent piezoelectric elements 11p to 11s. The bonding member 61 is formed to have a tape shape. Two surfaces of the bonding member 61 which are opposite to each other are coated with adhesive agents. The bonding member 61 adhesively fixed each adjacent piezoelectric elements 11p to 11s. A thickness of the bonding member 61 is controlled and set in accordance with arrangement of the sensor elements 13p to 13s, so that an space interval L between the adjacent piezoelectric elements 11p to 11s has a predetermined value, as shown in FIG. 1A. In the present embodiment, the thickness of the bonding member 61 is approximately 1 mm. In other words, the piezoelectric elements 11p to 11s are arranged and fixed so that the bonding member 61 causes the space interval L to be 1 mm.

The piezoelectric elements 11p to 11s are adhesively fixed through the bonding member 61. Thus, depending on an elastic modulus of the bonding member 61, there may be a possibility that vibrations are conducted between one piezoelectric element and another piezoelectric member through the bonding member 61, and a cross-talk characteristic is worsened. For example, when the ultrasonic wave received by the sensor elements 13p generates vibrations in the piezoelectric elements 11p, there may be a possibility that the vibration is conducted from the piezoelectric elements 11p to the piezoelectric element 11q through the bonding member 61. To prevent such a decrease in the cross-talk characteristic, the bonding member 61 is made of such material that: elastic modulus is smaller than that of each piezoelectric element 11p to 11s; and vibration conduction hardly occurs.

Figure 2:
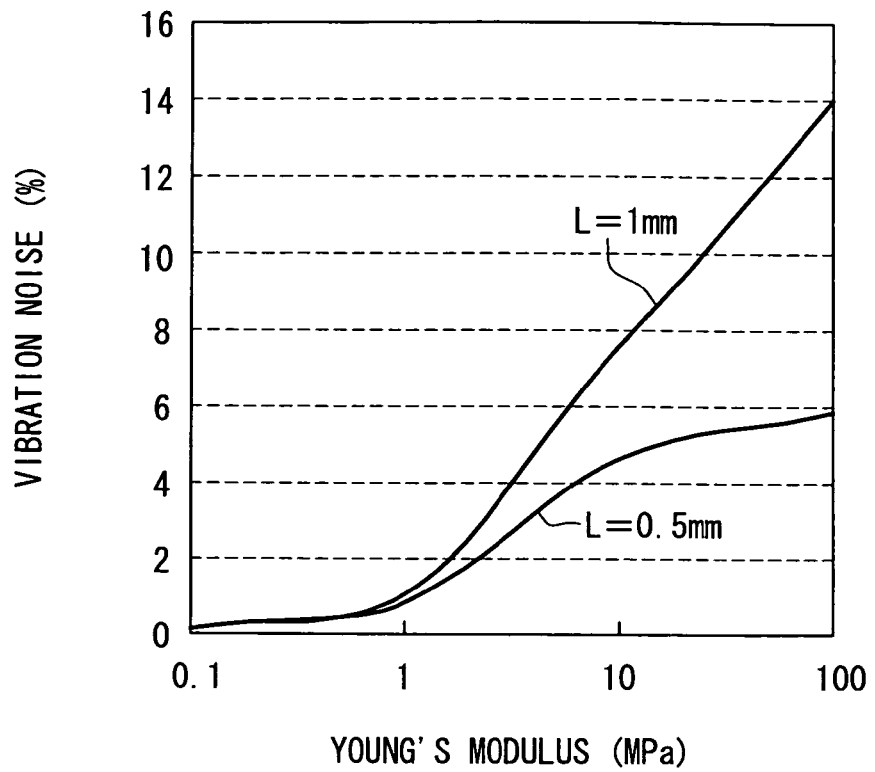
FIG. 2 is a graph showing vibration noise as a function of Young's modulus of a bonding member.

FIG. 2 is a graph showing vibration noise as function of elastic modulus of the bonding member 61. In the graph, the vertical axis of the graph indicates the vibration noise and the horizontal axis indicates the elastic modulus of the bonding member 61. In the graph, two cases are shown; one involves the space interval L being 0.5 mm; and the other involves the space interval L being 1 mm. As shown in FIG. 2, as an electric modulus is smaller, vibration noise is smaller. When the space interval L is 1 mm for instance, it is preferable that the bonding member 61 has an elastic modulus less than or equal to the 30 Mpa since the vibration noise is less than or equal to 10%. The bonding member 61 may be an adhesion tape made of silicone rubber, silicon resin, or the like, and both surfaces of the adhesion tape may be coated with adhesive agent.

Figure 3:
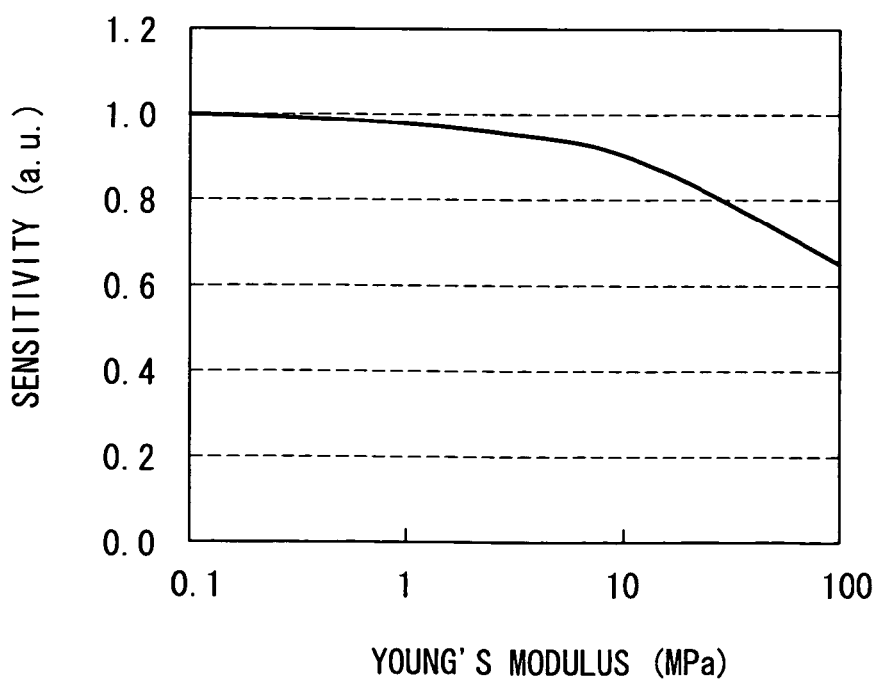
FIG. 3 is a graph showing sensitivity as a function of Young's modulus of the bonding member.

As shown in FIG. 3, the bonding member 61 having a lower elastic modulus improves a sensitivity of the ultrasonic sensor. For example, when the bonding member 61 is made of a material having an elastic modulus less than or equal to 30 MPa, the sensitivity drop is no more than 20%. When the bonding member 61 is made of a material having an elastic modulus less than or equal to 10 MPa, the sensitivity drop is less than or equal to 10%. It should be noted that the above trend is also found when the space interval L is 0.5 mm.

The piezoelectric elements 11p to 11s can be bonded through the bonding member 61 in the following manners.

Figure 4A:
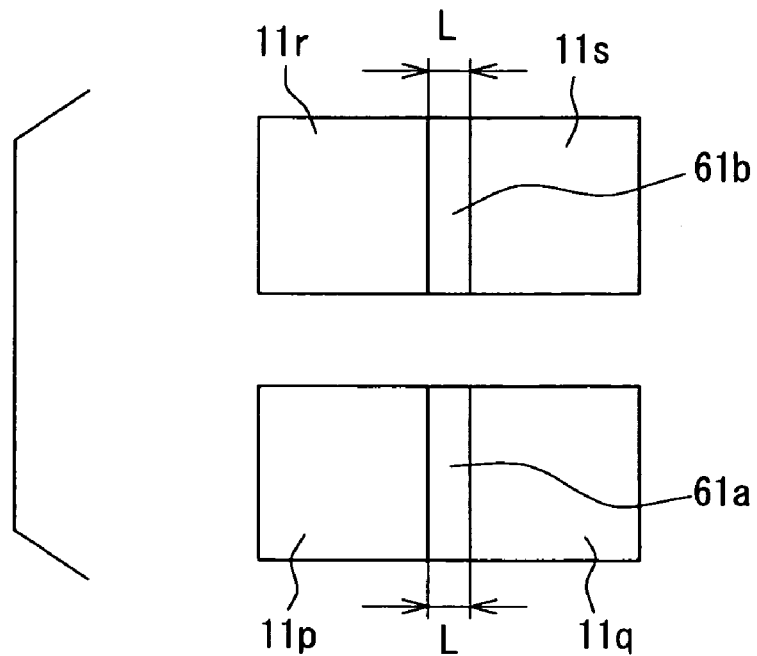
FIGS. 4A and 4B are explanatory traverse-cross-sectional diagrams schematically illustrating a process for adhesively fixing piezoelectric elements by using a bonding member.
Figure 4B:
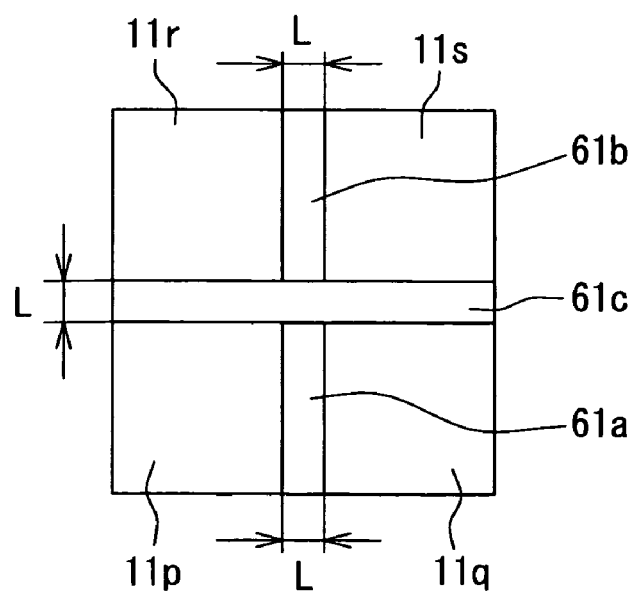

Side surfaces of the piezoelectric elements 11p and 11q are bonded and fixed to each other by using a bonding member 61a, as shown in FIG. 4A. Side surfaces of the piezoelectric elements 11r and 11s are bonded and fixed to each other by using a bonding member 61b, as shown in FIG. 4A. Then, as shown in FIG. 4B, the piezoelectric elements 11p and 11q are bonded and fixed to the piezoelectric elements 11r and 11s by using a bonding member 61c. Through the above manners, the four piezoelectric elements 11p to 11s are fixed through the bonding members 61a to 61c with the piezoelectric elements 11p to 11s having predetermined space intervals therebetween.

Explanation on obstacle detection is given below with reference to an exemplary case where the ultrasonic wave is transmitted from the sensor element 13p. The ECU outputs the control signal for controlling the sound pressure and the phase of the ultrasonic wave to be transmitted. The circuit element 18 outputs the voltage signal to the piezoelectric element 11p based on the control signal output from the ECU. The piezoelectric element 11p vibrates in accordance with the voltage signal, and thereby the piezoelectric element 11p oscillates the ultrasonic wave with a given sound pressure and a given phase. The ultrasonic wave oscillated by the piezoelectric element 11p is conducted to the acoustic matching member 12p, and is sent outside from the transmission reception surface 12a of the acoustic matching member 12p. The ultrasonic wave transmitted from the transmission reception surface 12a may be reflected by an obstacle. The reflected ultrasonic wave is received by the transmission reception surface 12a of the acoustic matching member 12p. The ultrasonic wave received by the transmission reception surface 12a is conducted to the piezoelectric element 11p through the acoustic matching member 12p. The ultrasonic wave conducted to the piezoelectric element 11p is sensed by the piezoelectric element 11p, and converted into the voltage signal. The voltage signal output from the piezoelectric element 11p is input to the ECU via the circuit element 18. The circuit element 18 performs the arithmetic processing based on the voltage signal from the piezoelectric element 11p.

Since the sensor elements 13p to 13s are arranged in an array, it is possible to measure, for example, a location of the obstacle by obtaining a difference in time or phase between the ultrasonic wave received by one sensor element and that received by another sensor element.

The vibration damping member 41 is located between the sensor elements 13p to 13s. Thus, the ultrasonic wave is individually conducted in each sensor element 13p to 13s, and is individually detected in each sensor element 13p to 13s. Therefore, a favorable crosstalk characteristic is provided. Further, detection sensitivity for ultrasonic wave improves.

The sensor elements 13p to 13s are arranged so that the distance "d" between the centers of the adjacent acoustic matching members 12p to 12s is approximately equal to half of the wavelength of the ultrasonic wave. Thus, it is possible to detect an incident angle of the received ultrasonic wave based on a difference in phase between those received by adjacent acoustic matching members 12p to 12s. Since it is possible to detect the incident angle of the ultrasonic wave with high accuracy, it is possible to improve accuracy for measuring a distance to the obstacle and a location of the obstacle.

The piezoelectric elements 11p to 11s are fixed and positioned in a state where the bonding member 61 precisely maintains the space intervals therebetween. Accordingly, it is possible to improve the accuracy for detection of a distance and a location of an obstacle. Since the bonding member 61 is made of a material having an elastic modulus smaller than each piezoelectric element 11p to 11s, the bonding member 61 restricts vibration conduction between the piezoelectric elements 11p to 11s, and as a result, the ultrasonic sensor is separately and individually conducted in each sensor element 13p to 13s. Therefore, a noise component is reduced and a favorable cross-talk characteristic is provided.

The bonding member 61 is in contact with only the piezoelectric elements 11p to 11s. Thus, the bonding member 61 does not restrict ultrasonic vibration that conducts through the acoustic matching member 12. The detection sensitivity for ultrasonic wave can be maintained at a favorable state.

In the ultrasonic sensor 10 according to the present embodiment, the sensor elements 13p to 13s can be more accurately positioned compared with a case where the sensor elements 13p to 13s are fixed by only using a vibration damping member. When an external force such as that due to shaking is load to the ultrasonic sensor 10, displacement of the positions of the piezoelectric elements 11p to 11s can be more effectively restricted compared with a case where sensor elements 13p to 13s are fixed by only using a vibration damping member.

Modifications of First Embodiment

A first modification is described below. The bonding member 61 may be located between not whole of the side surfaces of the piezoelectric elements 11p to 11s but between parts of the side surfaces of the piezoelectric elements 11p to 11s. The above configuration reduces a contact area between the bonding member 61 and each piezoelectric element 11p to 11s, and thus reduces vibration restraint. Therefore, it is possible to improve detection sensitivity for an ultrasonic wave. Alternatively, the adhesive agent may coat not whole of the surface of the bonding member 61 but a part of the surface of the bonding member 61.

A second modification is described below. The bonding member 61 may cover side surfaces of the first electrode 14p and extends toward the transmission reception surface 12a of each acoustic matching member 12p to 12s to improve a bonding strength. In the above case, it may be preferable that the bonding member 61 is extended as short as possible to reduce vibration damping. For example, it may be preferable that the extension is less than or equal to one-third of the thickness of the acoustic matching layer. In the above case, an edge of the extension is located at a position of a wave node, and thus, it is possible to suppress a decrease in the sensitivity.

A third modification is described below. The bonding member 61 may be an integrated so that the bonding member 61 has such a shape that a transverse cross section of the bonding member 61 is a cruciform. When the bonding member 61 has a cruciform shape, the piezoelectric elements 11p to 11s can be bonded by one process. Thereby, it is possible to simplify manufacturing processes. Further, each piezoelectric element 11p to 11s hardly deviates from the desired position of the piezoelectric element 11p to 11s. It is possible to improve the positioning accuracy.

Effect of First Embodiment

The bonding member 61 has a thickness approximately equal to the space intervals between the piezoelectric elements 11p to 11s. The piezoelectric elements 11p to 11s are bonded in such a state that the bonding member 61 fixes each adjacent piezoelectric elements 11p to 11s and precisely maintains the space intervals. Therefore, it is possible to accurately position each piezoelectric element 11p to 11s at a desired position. Because of the accurate positioning, it is possible to improve accuracy for detecting a distance to an object and a location of the object. Since the bonding member 61 is made of a material whose elasticity is lower than that of each piezoelectric element 11p to 11s, the bonding member 61 does not substantially restrict vibrations in each piezoelectric element 11p to 11s. Therefore, the ultrasonic sensor 10 maintains the detection sensitivity for the ultrasonic wave at an appropriate state. When the bonding member 61 has an elastic modulus less than or equal to 30 MPa for example, a decrease in the sensitivity is less than or equal to 20%. When the bonding member 61 has an elastic modulus less than or equal to 10 MPa, a decrease in the sensitivity is less than or equal to 10%. Since vibrations are hardly conducted from one piezoelectric element to another piezoelectric element, the ultrasonic wave is separately and individually conducted through each sensor element 13p to 13s. Since the above manners reduce vibration noise, it is possible to provide the ultrasonic sensor 10 with a favorable cross talk characteristic.

Second Embodiment

Figure 5A:
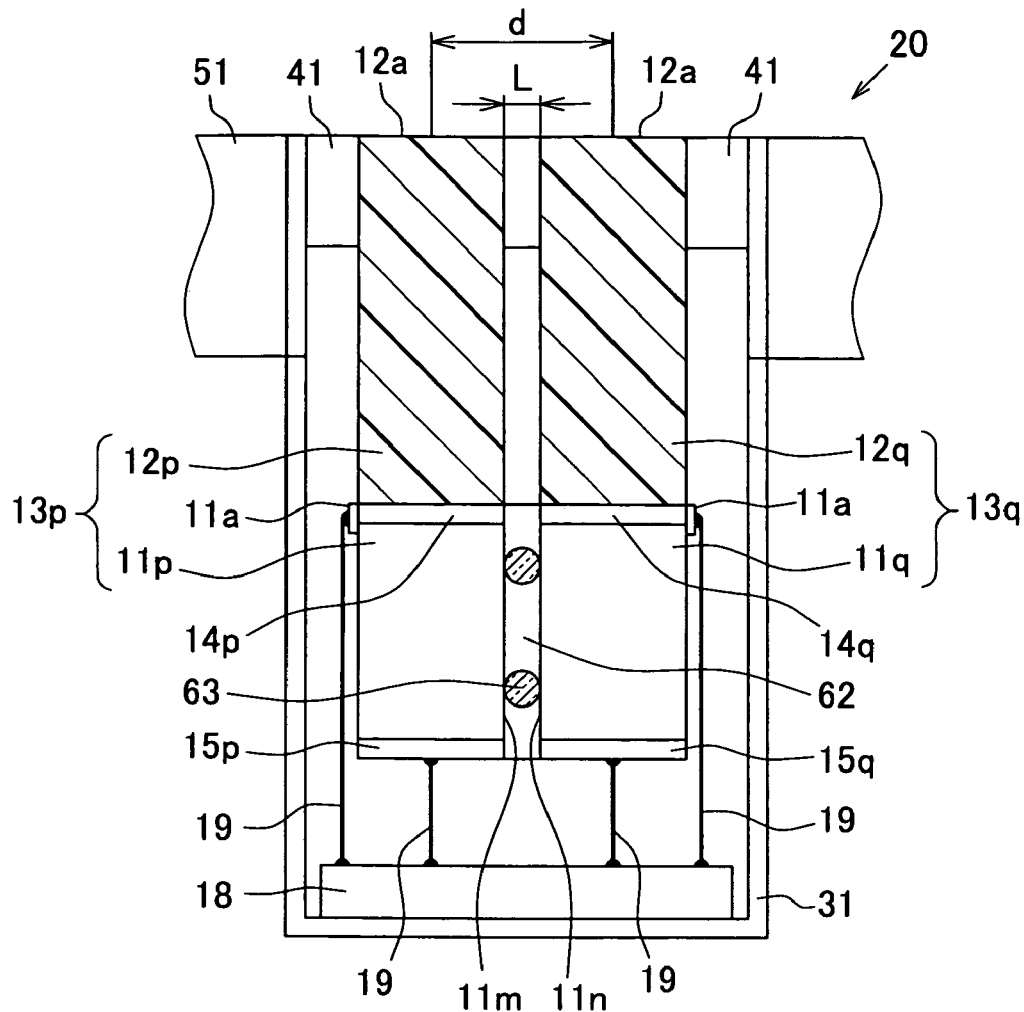
FIG. 5A is a schematic longitudinal cross sectional diagrams illustrating an ultrasonic sensor in accordance with a second embodiment.
Figure 5B:
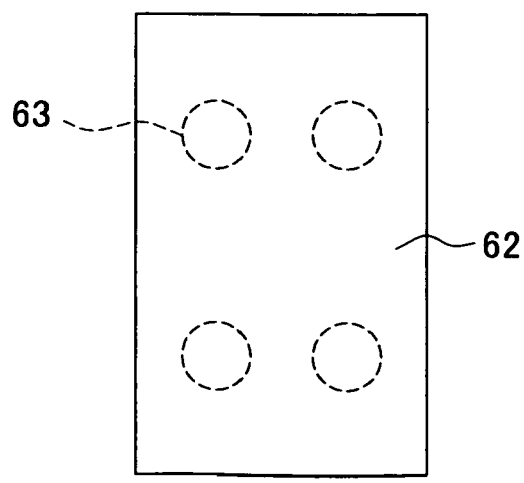
FIG. 5B is a schematic plan view diagram illustrating a bonding member in accordance with the second embodiment, the diagram being viewed from a bonding plane side of the bonding member.
Figure 6A:
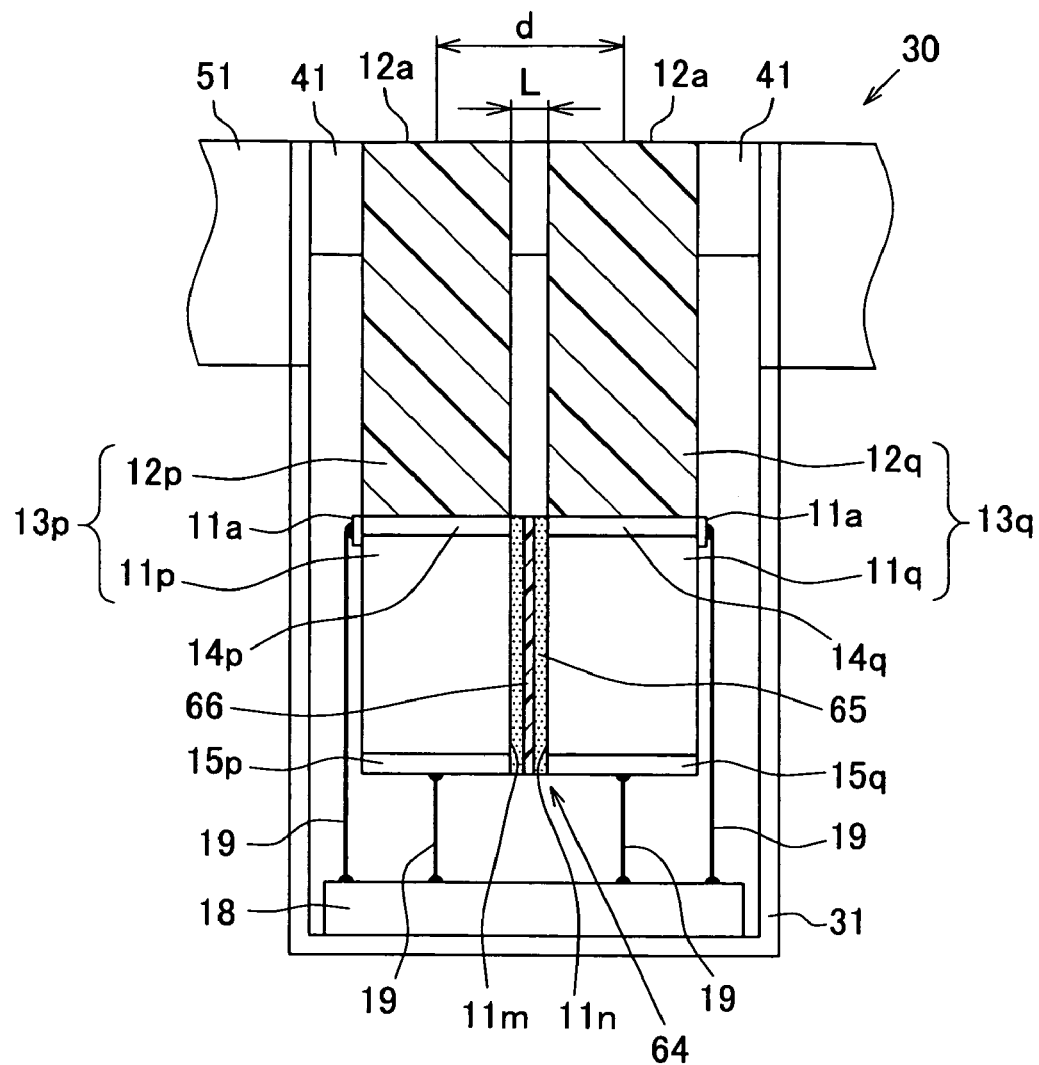
FIG. 6A is a schematic longitudinal cross sectional diagrams illustrating an ultrasonic sensor in accordance with a third embodiment.
Figure 6B:
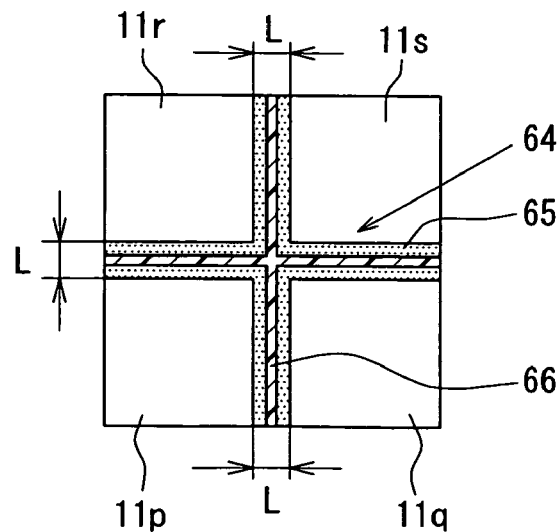
FIG. 6B is a schematic transverse cross sectional diagram illustrating piezoelectric elements in accordance with the third embodiment.

An ultrasonic sensor 20 is described below with reference to FIGS. 5A and 5B in accordance with a second embodiment.

The ultrasonic sensor 20 according to the second embodiment is different from the ultrasonic sensor 10 according to the first embodiment in a configuration of a bonding member. As shown in FIGS. 5A and 5B, the ultrasonic sensor 20 includes a bonding member 62 and a spacer 63. The spacer 63 is embedded in the bonding member 62. The spacer 63 is made of a material whose elastic modulus is larger than that of the bonding member. The spacer 63 has a exterior size approximately equal to a thickness of the bonding member 62. The spacer 63 and the bonding member 62 are integrally formed.

The spacer 63 is provided by multiple beads each having a spherical shape with a diameter 1 mm and each made of glass, hard resin, or the like. As shown in FIG. 5B, the spacer 63 provides four beads arranged 2 by 2. That is, an outside diameter of the spacer 63 (i.e., the bead) is substantially equal to the thickness of the bonding member 62. When a side surface 11m of the piezoelectric element 11p is bonded to a side surface 11n of the piezoelectric element 11q through the bonding member 62, the spacer 63 is in contact with the side surface 11m and the side surface 11n.

As described above, since the spacer 63 is embedded in the bonding member 62, a total effective elastic modulus of the bonding member 62 and the spacer 63 is maintained at a low elasticity. The space interval between the piezoelectric elements 11p and 11s is maintained at a predetermined value in such a manner that the spacer 63 is in contact with the side surface 11m of the piezoelectric element 11p and the side surface 11n of the piezoelectric element 11q. Thereby, it is possible to improve the positioning-accuracy of each piezoelectric element 11p to 11s, compared with a case where the space 63 is absent.

The spacer 63, which is provided by the beads made of glass or hard resin, has a lower coefficient of thermal expansion than the bonding member 62 has. Accordingly, the spacer 63 restricts thermal expansion and thermal contraction of the bonding member 62. Since the above properties suppress a change in the space intervals between the piezoelectric elements 11p to 11s, it is possible to improve detection accuracy for the ultrasonic wave associated with a thermal characteristic.

Modifications of Second Embodiment

The spacer 63 may have various shape such as a columnar shape, a plate shape, or the like. It is necessary that the spacer 63 is made of a material whose elasticity is larger than that of the bonding member 62. For example, the spacer 63 may be made of metal such as stainless steel.

Effect of Second Embodiment

The ultrasonic sensor 20 according to the second embodiment has similar effects as the ultrasonic sensor 10 according to the first embodiment has. In addition, the ultrasonic sensor 20 according to the second embodiment has the following effects. According to the second embodiment, the spacer 63 is embedded into the bonding member 62. The spacer 63 has an exterior size approximately equal to a thickness of the bonding member 62. An elastic modulus of the spacer 63 is larger than that of the bonding member 62. The spacer 63 and the bonding member 62 are integrally formed. Since the spacer 63 contacts the side surface 11m of the piezoelectric element 11p and the side surface 11n of the piezoelectric element 11q, it is possible to maintain the space interval between the side surface 11m of the piezoelectric element 11p and the side surface 11n of the piezoelectric element 11q at a given distance while a combination of the spacer 63 and the bonding member 62 has a low effective elastic modulus. Accordingly, the positioning accuracy of each piezoelectric element 11p to 11s improves compared with a case where the spacer 63 is absent.

Third Embodiment

An ultrasonic sensor 30 is described below with reference to FIGS. 6A, 6B, 7A, 7B, 8A, 8B, 9A, 9B, and 10 in accordance with a third embodiment.

Figure 7A:
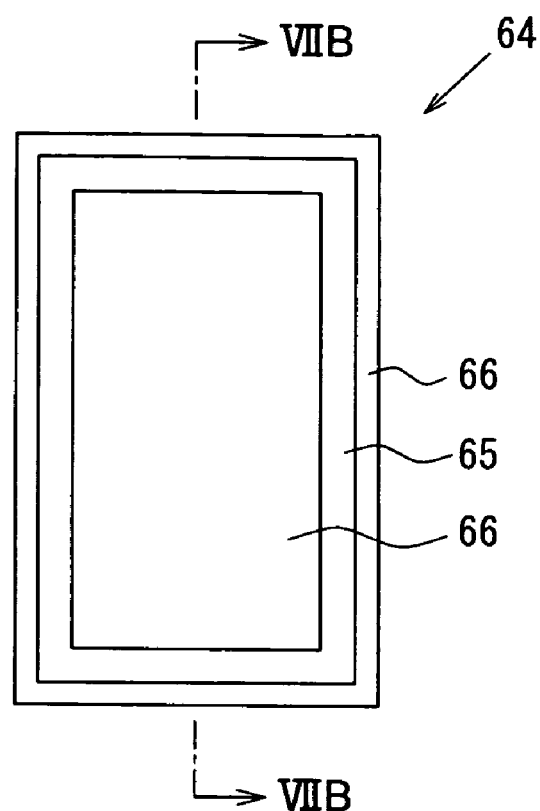
FIG. 7A is a schematic plan view diagram illustrating a bonding member of an ultrasonic sensor in accordance with a first modification of the third embodiment.
Figure 7B:
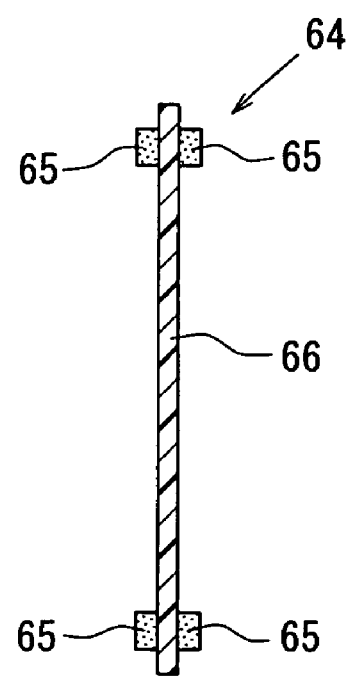
FIG. 7B is a schematic cross sectional view of the bonding member taken along line VIIB-VIIB in FIG. 7A.

As shown in FIGS. 7A and 7B, the ultrasonic sensor 30 according to the third embodiment includes a bonding member 64. The bonding member 64 includes bonding layers 65 for fixing each piezoelectric element 11p to 11s and a core member 66 that is bonded between the bonding layers 65. The core member 66 has a plate shape. The core member 66 has a thickness of 0.2 mm, and each bonding layer has a thickness of 0.5 mm.

Similarly to the bonding member 61 according to the first embodiment, the bonding layers 65 are such that an elastic modulus of the bonding layers 65 is lower than that of each piezoelectric element 11p to 11s, and such that vibrations are hardly conducted through the bonding layers 65. For example, the bonding member 64 may be such a adhesion tape that the bonding layers 65 are located on both surfaces of the adhesion tape and the bonding layers are provided by coating adhesive agent on the both surfaces. Each bonding layer 65 of the bonding member 64 contacts each piezoelectric element 11p to 11s. The bonding layers 65 are made of a material whose elasticity is smaller than that of each piezoelectric element 11p to 11s.

An elastic modulus and an acoustic impedance of the core member 66 are larger than those of the bonding layers 65. The core member 66 is made of, for example, hard resin. The core member 66 is formed so that a transverse cross section is cruciform. The core member 66 provides compartment boundary between the side surfaces of the piezoelectric elements.

Since the bonding member 64 is configured such that the core member 66 made of hard resin supports the bonding layers 65, the shape of the bonding member 64 can be well maintained compared with a configuration where the core member 66 is absent.

Since the acoustic impedances are different between the bonding layer 65 and the core member 66, when vibrations try to conduct from the piezoelectric element 11p to the piezoelectric element 11s, the vibrations are reflected at a boundary between the bonding layer 65 and the core member 66. That is, vibration conduction between one piezoelectric element and another piezoelectric element 11s is suppressed. Therefore, it is possible to provide the ultrasonic sensor 30 with a favorable cross talk characteristic.

Since the coefficient of thermal expansion of the core member 66 made of hard resin is smaller than the bonding layers 65, thermal expansion and contraction of the bonding member 64 is small. Accordingly, it is possible to suppress a change in the space intervals between the piezoelectric elements 11p to 11s, and it is therefore possible to improve ultrasonic detection accuracy associated with a thermal characteristic.

Modifications of Third Embodiment

A first modification is described below with reference to FIGS. 7A and 7B. According to the above embodiment, the bonding layers 65 are respectively formed on whole of the both surfaces of the core member 66. Alternatively, the bonding layers 65 may be respectively formed on parts of the both surfaces of the core member 66. As shown in FIGS. 7A and 7B, each bonding layer 65 may have a rectangular ring shape. The piezoelectric elements 11p to 11q are fixed by using the bonding layers 65 through the core member 66. The bonding layer 65 having the above shape reduces a contact area between each bonding layer and each piezoelectric element 11p to 11s reduces. Thus, the bonding member 64 does not strongly restrain vibrations in each piezoelectric element 11p to 11s. The detection sensitivity for the ultrasonic wave can be maintained at a favorable condition in the ultrasonic sensor 30. Since vibration conduction hardly occurs between one piezoelectric element and another piezoelectric element 11p to 11s, the ultrasonic wave individually and separately travels in each sensor element 13p to 13s. Thus, a noise component reduces. A favorable cross talk characteristic is provided.

Figure 8A:
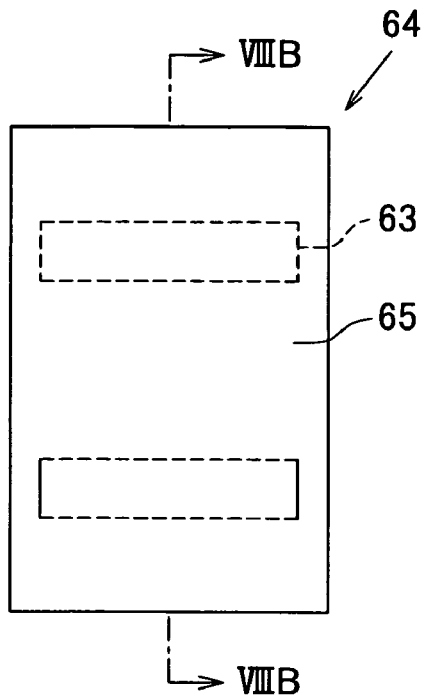
FIG. 8A is a schematic plan view diagram illustrating a bonding member of an ultrasonic sensor in accordance with a second modification of the third embodiment.
Figure 8B:
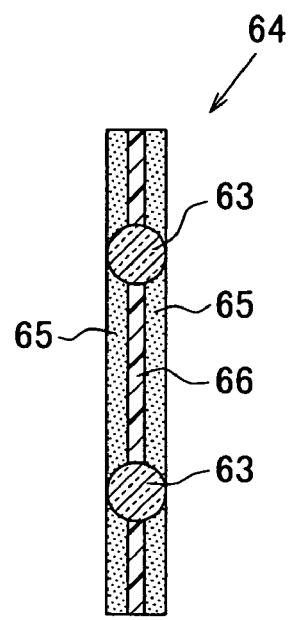
FIG. 8B is a schematic cross sectional view of the bonding member taken along line VIIIB-VIIIB in FIG. 8A.
Figure 8C:
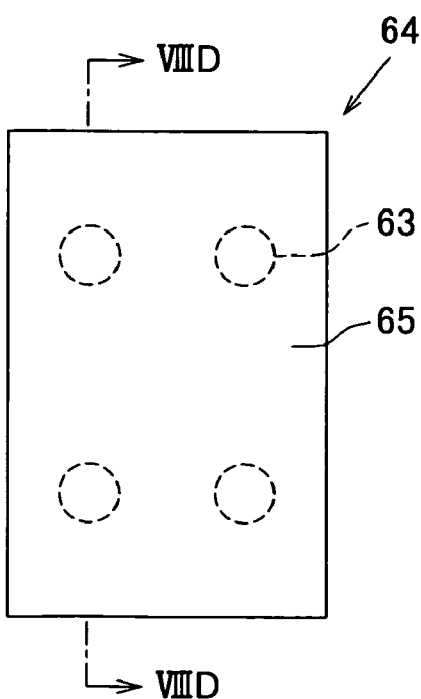
FIG. 8C is a schematic plan view diagram illustrating a bonding member of an ultrasonic sensor in accordance with a third modification of the third embodiment.
Figure 8D:
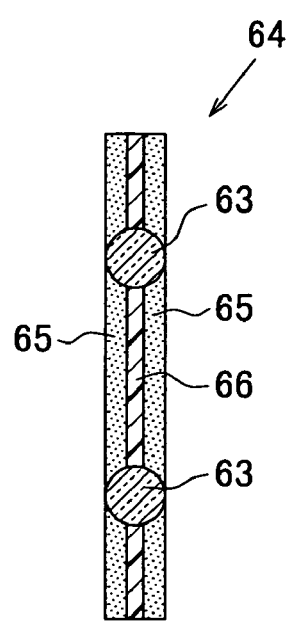
FIG. 8D is a schematic cross sectional view of the bonding member taken along line VIIID-VIIID in FIG. 8C.

A second modification of the third embodiment is described below with reference to FIGS. 8A to 8D. The bonding member 64 according to the third embodiment and the spacer according to the second embodiment may be used in combination. For example, as shown in FIGS. 8A and 8B, two parallel spacers 63 each having a circular cylindrical shape may be respectively arranged at a top portion and a bottom portion of the bonding member 64. Alternatively, as shown in FIGS. 8C and 8D, four spacers 63 each having a spherical shape may be arranged 2 by 2. Alternatively, the spacer 63 may have an arbitrary shape. The spacer 63 may be formed separately from the core member 66. Alternatively, the spacer 63 and the core member 66 may be integrally formed. When the bonding member has the above-described configurations, the core member 66 improves a cross-talk characteristic, and further, the spacer 63 improves positioning accuracy of the piezoelectric elements 11p to 11s.

Figure 9A:
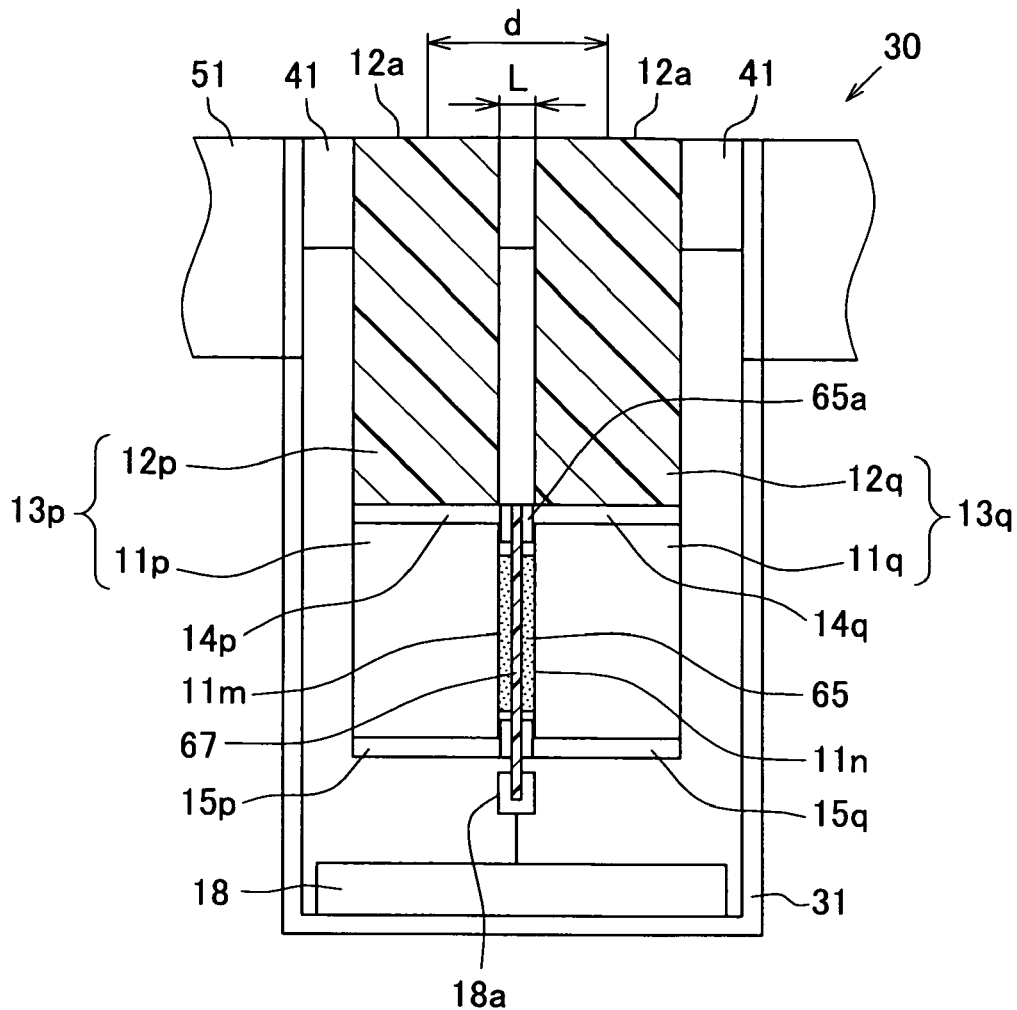
FIG. 9A is a schematic longitudinal cross sectional diagrams illustrating an ultrasonic sensor in accordance with a fourth modification of the third embodiment.
Figure 9B:
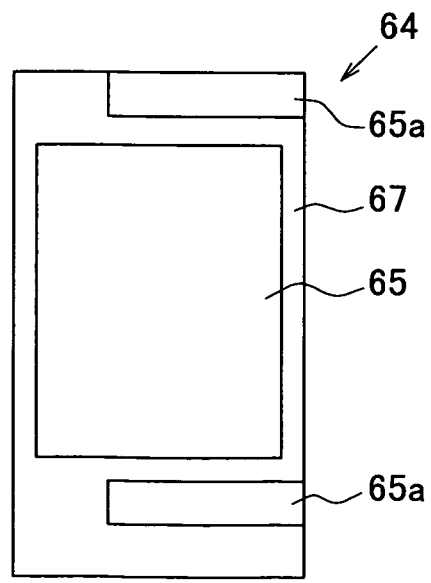
FIG. 9B is a schematic plan view diagram illustrating a bonding member of the ultrasonic sensor in accordance with the fourth modification of the third embodiment.

A third modification of the third embodiment is described below with reference to FIGS. 9A and 9B. The bonding layers 65 may include an electric conductive region for providing an electrical connection between each piezoelectric element 11p to 11s and an external line. As shown in FIGS. 9A and 9B, the core member may be a plate member having a structure for wiring. For example, the core member may be a printed circuit board. The bonding layers 65 include conductive adhesion layers 65a, each of which may be an electrically conductive tape. The conductive adhesion layer 65 is located at a place which contacts each first electrode 14p, 14q of the piezoelectric element 11p, 11q and at a place contacting each second electrode 15p, 15q of the piezoelectric element 11p, 11q. As shown in FIG. 9A, each of the first and second electrodes 14p, 15p partially covers the side surface 11m of the piezoelectric element 11p, and each of the first and second electrodes 14p and 15p partially covers the side surface 11n of the piezoelectric element 11q. Each electrode of the piezoelectric element 11p, 11q is electrically connected with a line in the printed circuit board 67 through the electrical conductive layer 65a. The printed circuit board 67 sticks out to outside from a lower portion of a space between the piezoelectric element 11p and the piezoelectric element 11q. A connection part located at an end portion of the printed circuit board 67 is inserted into a connector 18a and electrically connected with the circuit element 18. When the above configuration is employed, it is possible to electrically connect between each piezoelectric element 11p to 11s and the circuit element 18 without performing a wiring process such as wire bonding. It is possible to provide a high reliable wiring. While the invention has been described with reference to preferred embodiments thereof, it is to be understood that the invention is not limited to the preferred embodiments and construction. The invention is intended to cover various modification and equivalent arrangements. In addition, while the various combinations and configurations, which are preferred, other combinations and configurations, including more, less or only a single element, are also within the spirit and scope of the invention.

Figure 10:
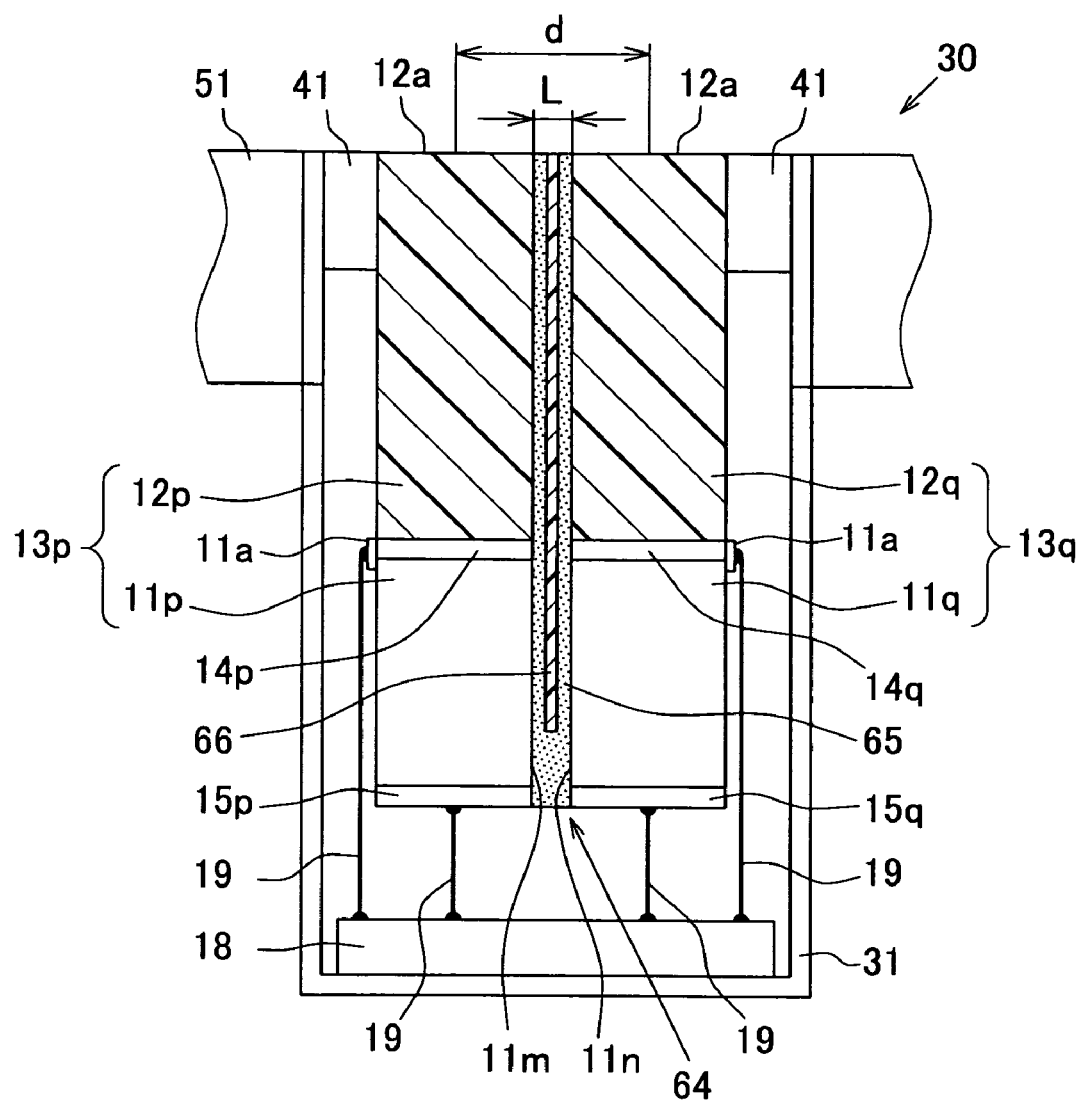
FIG. 10 is a schematic longitudinal cross sectional diagrams illustrating an ultrasonic sensor in accordance with a first modified embodiment.

A fourth modification of the third embodiment is described below with reference to FIG. 10. As shown in FIG. 10, the bonding member 64 may bond between whole of one side surface of the sensor element 13p to 13s and whole of another side surface of the sensor element 13p to 13s, the one and another side surfaces facing each other. In other words, whole of one side surface of piezoelectric elements 11p to 11s and the acoustic matching members 12p to 12s may be bonded to another side surface of the piezoelectric elements 11p to 11s and the acoustic matching members 12p to 12s through the bonding member 64, the one and another side surfaces facing each other. When the above configuration is employed, it may be preferable that the core member 66 is located so that the core member 66 partitions the acoustic matching members 12p to 12s in order to restrict vibration transmission from one acoustic matching member to another acoustic matching member 12p to 12s. Since the above configuration increases in a contact area, the bonding strength and the positioning accuracy improve. Further, vibration noise is effectively suppressed.

Effect of Third Embodiment

The bonding member 64 includes the bonding layers 65 for fixing the piezoelectric elements 11p to 11s and the core member 66 located between the bonding layers 65. The core member 66 has a plate shape and made of hard resin. Accordingly, the shape of the bonding member 64 is easily maintained. The bonding member 64 is easy to use in a bonding process. Since the acoustic impedance of the bonding layer 65 is different from that of the core member 66, the vibrations trying to conduct between the piezoelectric elements 11p to 11s are reflected at a boundary between the bonding layer 65 and the core member 66. Thus, vibration conduction between the piezoelectric elements 11p to 11s is suppressed. Therefore, it is possible to provide a favorable cross talk characteristic.

The bonding layers 65 include the line 65a for connecting between each piezoelectric element 11p to 11s and an external line. Thus, it is possible to electrically connect between each piezoelectric element 11p to 11s and the circuit element 18 without performing a wiring process such as wire bonding. It is possible to provide a high reliable wiring easily. It may be preferable that the printed circuit board 67 is used as the core member since the printed circuit board 67 provides a line for electrically connecting to an external line.

When the bonding member 64 is configured to extend to a side of each acoustic matching member 12p to 12s, the contact area increases, it is possible to improve bonding strength and positioning accuracy. The printed circuit board 67 (i.e., the core member) is located at least between adjacent acoustic matching members 12p to 12s. Accordingly, it is possible to restrict ultrasonic wave transmission between the acoustic matching members 12p to 12s.

Other Embodiments

Figure 11:
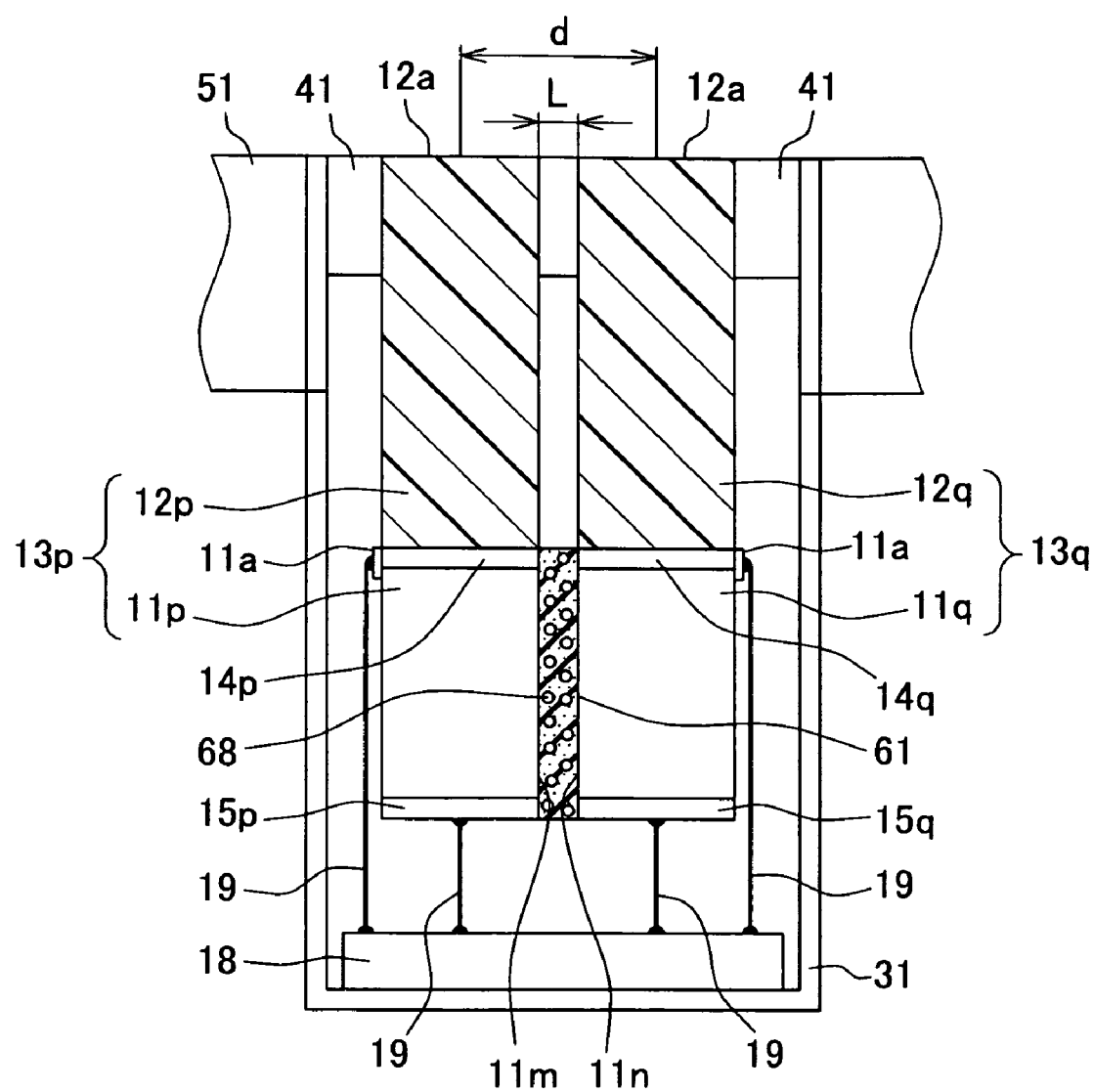
FIG. 11 is a schematic longitudinal cross sectional diagrams illustrating an ultrasonic sensor in accordance with a second modified embodiment.

As shown in FIG. 11, a dispersion member 68 may be dispersed in the bonding member 61. The dispersion member 68 includes dispersion elements each having a substantially spherical shape and made of hard resin. In the above configurations, since a coefficient of thermal expansion of the dispersion member 68 made hard resin is smaller than that of the bonding member 61, the bonding member 61 can have a small thermal expansion and thermal contraction. Accordingly, a change in the space intervals between the piezoelectric elements 11p to 11s is suppressed, and it is possible to improve the accuracy of ultrasonic wave detection in connection with a thermal characteristic of the ultrasonic sensor. Alternatively, the bonding member 61 may be made of a foamed material having bubbles. In this case, the presence of the bubbles reduces effective elasticity of the bonding member. Since the bubbles causes reduction of the vibration due to damping, a favorable cross talk characteristic is provided.

For fixing the sensor elements 13p to 13s, a part of the bonding member 61 may be located at a place corresponding to a position of a node of a standing wave generated proximal to the second electrode 15p of each piezoelectric element 11p to 11s. The node is located at a position where the ultrasonic wave has a minimum amplitude with respect to the traveling direction of the ultrasonic wave. The node position may be specified by performing a simulation, actual measurement of an amplitude, or the like. In the above configuration also, it is possible reduce a vibration damping resulting from restraint by the bonding member 61.

Figure 12:
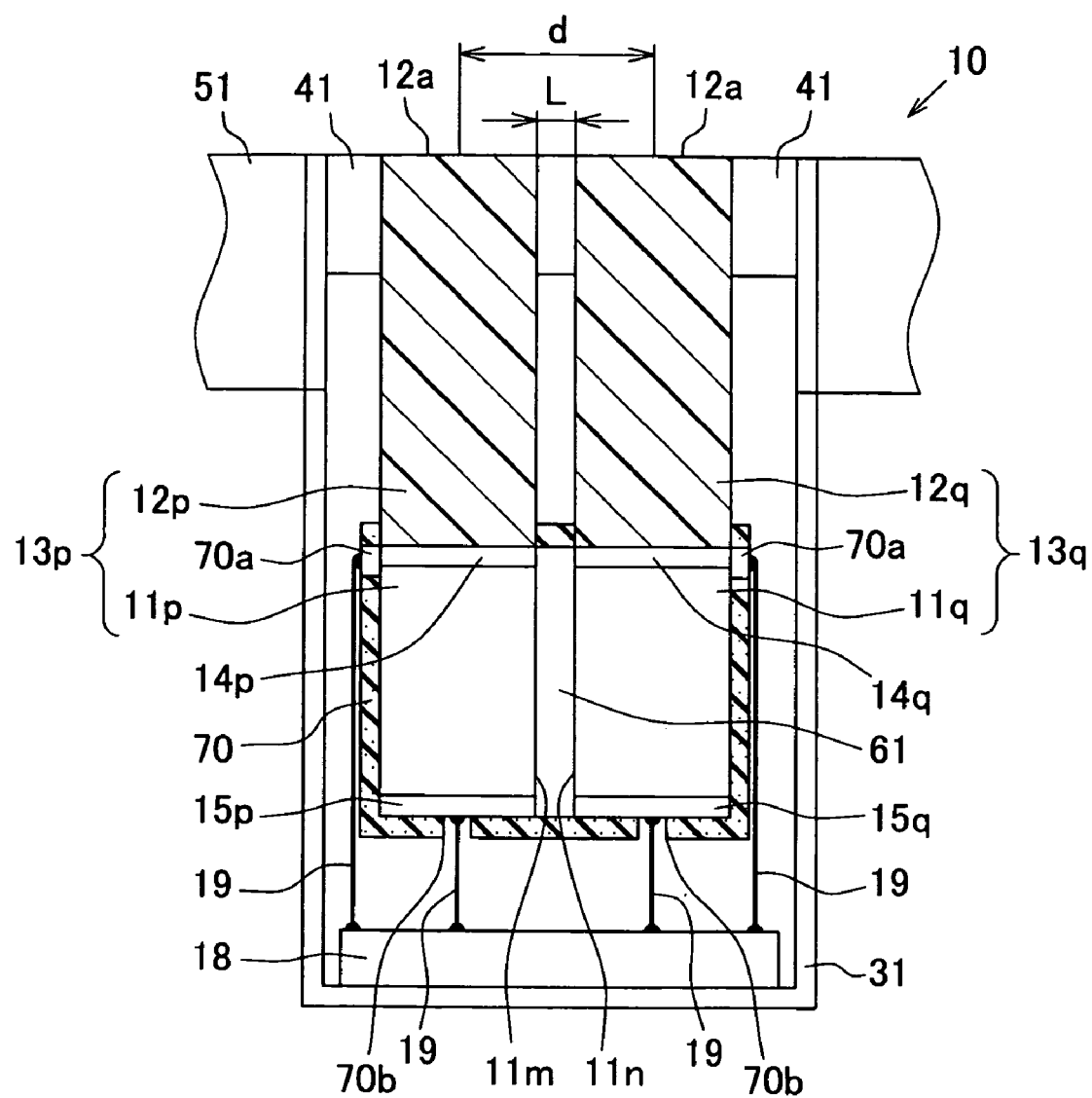
FIG. 12 is a schematic longitudinal cross sectional diagrams illustrating an ultrasonic sensor in accordance with a third modified embodiment.
Figure 13:
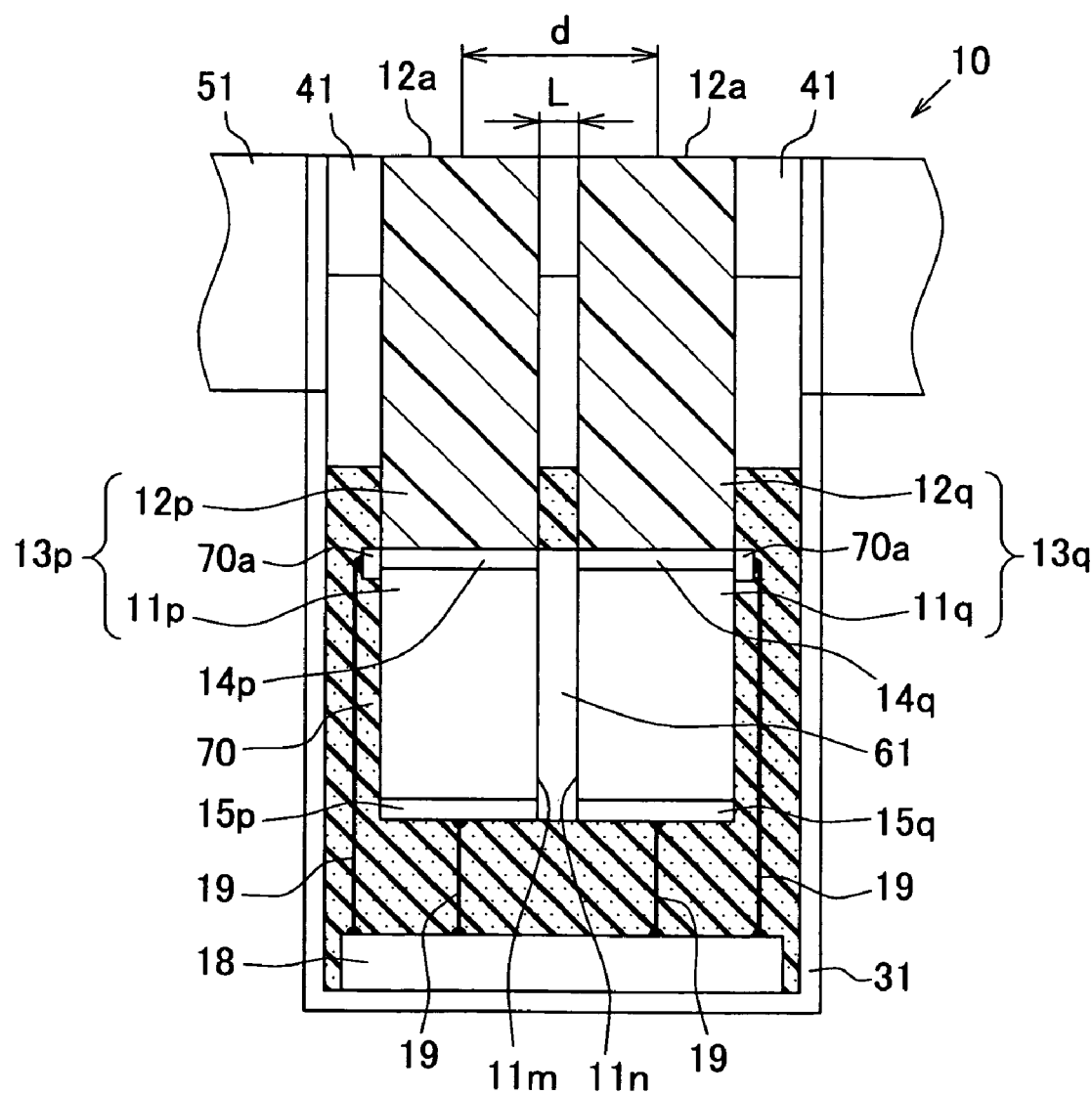
FIG. 13 is a schematic longitudinal cross sectional diagrams illustrating an ultrasonic sensor in accordance with a fourth modified embodiment.
Figure 14:
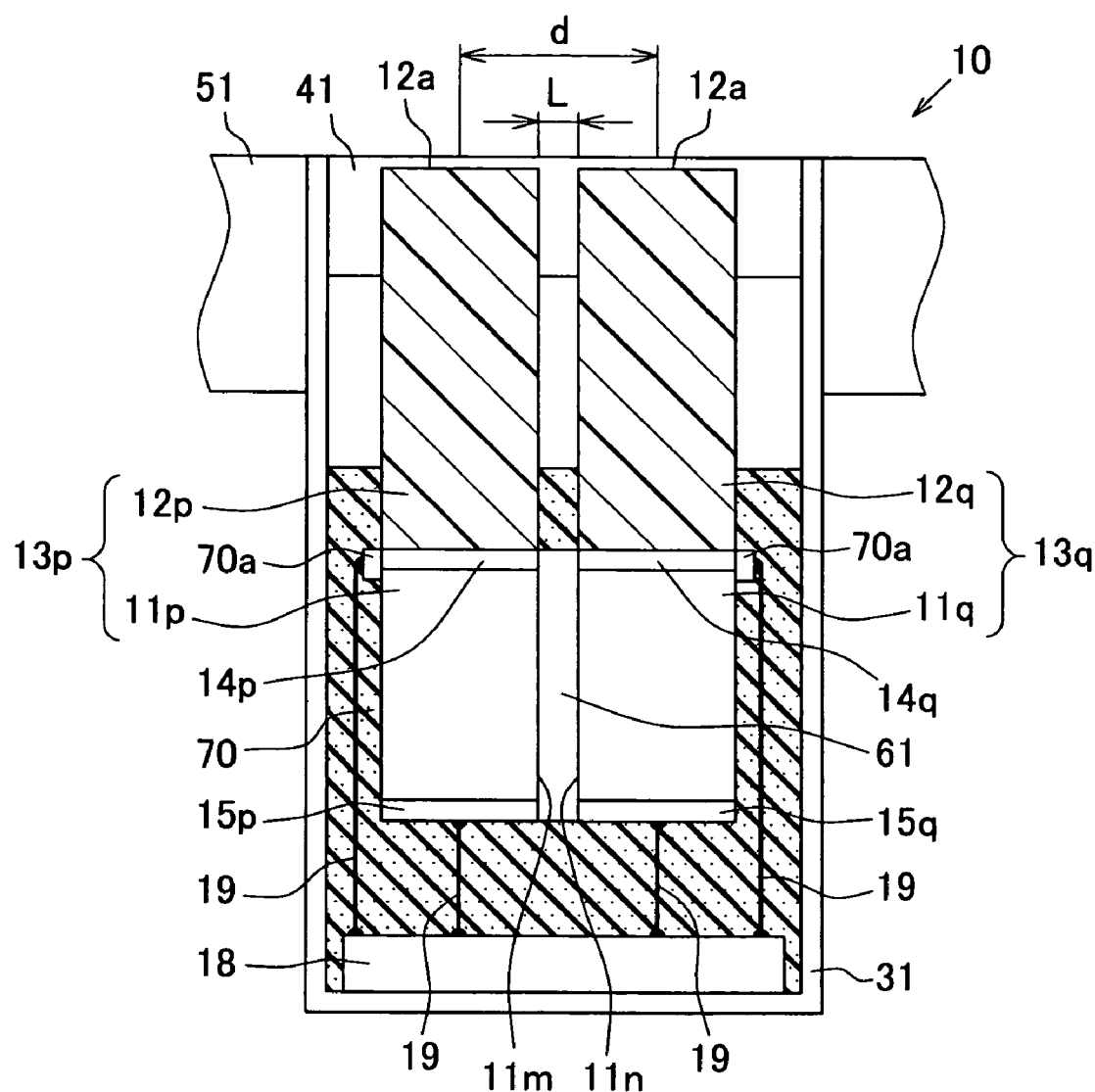
FIG. 14 is a schematic longitudinal cross sectional diagrams illustrating an ultrasonic sensor in accordance with a fifth modified embodiment.

As shown in FIG. 12, the ultrasonic sensor may further include a protection member 70, which covers an outer peripheral surface of the multiple piezoelectric elements 11p to 11s. The protection member 70 is made of such a low elastic material that vibration conduction is not restricted. The protection member 70 is made of, for example, foamed rubber, potting material, or the like. The protection member 70 may be configured so as to cause application of compressive pressure to the piezoelectric elements 11p to 11s toward the center of the piezoelectric elements 11p to 11s. In the above case, each piezoelectric element 11p to 11s can more reliably keep the appropriate position. It is therefore possible to improve the positioning accuracy. The protection member 70 can protect and shield the piezoelectric elements 11p to 11s from environmental factor such as water that causes deterioration. It is therefore possible to improve the ultrasonic sensor in respect of reliability. Connection between the circuit element 18 and each piezoelectric element 11p to 11s may be made in the following manner. The protection member 70 may include conductive layers 70a made of conductive material, and the conductive layers 70a may be connected with the electrodes of the piezoelectric elements 11p to 11s. Alternatively, the protection member 70 may have a hole for a line so that a part of each electrode of the piezoelectric element 11p to 11s is exposed. Alternatively, as shown in FIG. 13, the protection member 70 fills in a space between an inner wall of the case 31, the circuit element 18, an outer surface of each piezoelectric element 11p to 11s. The protection member 70 further fills in a space between the inner wall of the case 31 and a part of an outer surface of each acoustic matching member 12p to 12s so that the protection member 70 is located up to one-fifth length of the acoustic matching member (i.e., about 1 mm) above from a contact surface between each acoustic matching member and the piezoelectric member. In the above case, a potting member may be preferably used as the protection member. Alternatively, as shown in FIG. 14, the vibration damping member 41 may cover a surface of the multiple acoustic matching members 12p to 12s. In the above case, a portion of the vibration damping member 41 covering the transmission reception surfaces 12a has a thickness of, for example, 1 mm so that the received ultrasonic wave with sufficient intensity is conducted to the reception surface of each acoustic matching member 12p to 12s. In the above configuration, the boundary surface between the vibration damping member 41 and each acoustic matching member 12p to 12s is not exposed to outside. Since the vibration damping member 41 can prevent water from entering through the bonding surface, it is possible to improve the ultrasonic sensor in respect of reliability.

In the above embodiments, the ultrasonic sensor includes multiple piezoelectric elements, each of which is capable of transmitting and receiving an ultrasonic wave. Alternatively, the ultrasonic sensor may include an ultrasonic sensing element for only transmitting an ultrasonic wave instead of the multiple piezoelectric elements, and the ultrasonic sensor may further include an ultrasonic wave transmission element.

While the invention has been described with reference to preferred embodiments thereof, it is to be understood that the invention is not limited to the preferred embodiments and construction. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An ultrasonic sensor comprising:
a plurality of sensor elements arranged in an array, each sensor element including:
an ultrasonic sensing element for sensing an ultrasonic wave reflected by an object; and
an acoustic matching member having a reception surface for receiving the ultrasonic wave reflected by the object, wherein the reception surface is directed to a space where the object is expected to exist, wherein a surface of the acoustic matching member opposed to the reception surface is connected with the ultrasonic sensing element, wherein the acoustic matching member conducts the ultrasonic wave received by the reception surface to the ultrasonic sensing element; and a bonding member having a thickness approximately equal to a space interval between adjacent ultrasonic sensing elements, wherein the bonding member adhesively fixes the plurality of sensor elements, wherein the bonding member includes a portion contacting each ultrasonic sensing element, wherein an elastic modulus of the portion is smaller than that of each ultrasonic sensing element, wherein the bonding member includes a spacer having an exterior size substantially equal to the thickness of the bonding member;

the spacer is embedded in the bonding member;

an elastic modulus of the spacer is larger than that of the bonding member; and the spacer and the bonding member are integrally formed.

2. The ultrasonic sensor according to claim 1, wherein:
a coefficient of thermal expansion of the spacer is smaller than that of the bonding member.

3. An ultrasonic sensor comprising:
a plurality of sensor elements arranged in an array, each sensor element including:
an ultrasonic sensing element for sensing an ultrasonic wave reflected by an object; and
an acoustic matching member having a reception surface for receiving the ultrasonic wave reflected by the object, wherein the reception surface is directed to a space where the object is expected to exist, wherein a surface of the acoustic matching member opposed to the reception surface is connected with the ultrasonic sensing element, wherein the acoustic matching member conducts the ultrasonic wave received by the reception surface to the ultrasonic sensing element; and a bonding member having a thickness approximately equal to a space interval between adjacent ultrasonic sensing elements, wherein the bonding member adhesively fixes the plurality of sensor elements, wherein the bonding member includes a portion contacting each ultrasonic sensing element, wherein an elastic modulus of the portion is smaller than that of each ultrasonic sensing element, wherein the bonding member includes a plurality of bonding layers and a core member located between the plurality of bonding layers; and the plurality of bonding layers adhesively fixes the plurality of ultrasonic sensing elements.

4. The ultrasonic sensor according to claim 3, wherein each bonding layer includes a wiring part for providing electrical connection between each ultrasonic sensing element and an external wiring.

5. The ultrasonic sensor according to claim 4, wherein the core member is a printed circuit board.

6. The ultrasonic sensor according to claim 3, wherein:
the bonding member extends to a side surface of each acoustic matching member; and
the core member is located at least between adjacent acoustic matching members.

7. An ultrasonic sensor comprising:
a plurality of sensor elements arranged in an array, each sensor element including:
an ultrasonic sensing element for sensing an ultrasonic wave reflected by an object; and
an acoustic matching member having a reception surface for receiving the ultrasonic wave reflected by the object, wherein the reception surface is directed to a space where the object is expected to exist, wherein a surface of the acoustic matching member opposed to the reception surface is connected with the ultrasonic sensing element, wherein the acoustic matching member conducts the ultrasonic wave received by the reception surface to the ultrasonic sensing element;

a bonding member having a thickness approximately equal to a space interval between adjacent ultrasonic sensing elements, wherein the bonding member adhesively fixes the plurality of sensor elements, wherein the bonding member includes a portion contacting each ultrasonic sensing element, wherein an elastic modulus of the portion is smaller than that of each ultrasonic sensing element; and a protection member that covers an outer peripherical surface of the plurality of ultrasonic sensing elements and a part of an outer peripherical surface of the plurality of acoustic matching members, wherein the protection member protects the plurality of ultrasonic sensing elements and the plurality of acoustic matching members.

8. The ultrasonic sensor according to claim 3, wherein:

an elastic modulus and an acoustic impedance of the core member are larger than those of each bonding layer.

9. The ultrasonic sensor according to claim 3, wherein:

a coefficient of thermal expansion of the core member is smaller than that of each bonding layer.

10. An ultrasonic sensor comprising:

a plurality of sensor elements arranged in an array, each sensor element including:

an ultrasonic sensing element for sensing an ultrasonic wave reflected by an object; and an acoustic matching member having a reception surface for receiving the ultrasonic wave reflected by the object, wherein the reception surface is directed to a space where the object is expected to exist, wherein a surface of the acoustic matching member opposed to the reception surface is connected with the ultrasonic sensing element, wherein the acoustic matching member conducts the ultrasonic wave received by the reception surface to the ultrasonic sensing element; and a bonding member having a thickness approximately equal to a space interval between adjacent ultrasonic sensing elements, wherein the bonding member adhesively fixes the plurality of sensor elements, wherein the bonding member includes a portion contacting each ultrasonic sensing element, wherein an elastic modulus of the portion is smaller than that of each ultrasonic sensing element, wherein the bonding member includes a dispersion member therein; and a coefficient of thermal expansion of the dispersion member is smaller than that of the bonding member.

* * * * *